Jan. 28, 1964

C. HARDERS 3,119,202

THREE-DIMENSIONAL TRELLIS

Filed April 2, 1962

INVENTOR.
CLARENCE HARDERS

BY Irwin C. Alter

ATTORNEY

United States Patent Office 3,119,202
Patented Jan. 28, 1964

3,119,202
THREE-DIMENSIONAL TRELLIS
Clarence Harders, Round Lake, Ill., assignor to Persson Engineering Company, Chicago, Ill., a corporation of Illinois
Filed Apr. 2, 1962, Ser. No. 185,772
2 Claims. (Cl. 47—47)

This invention relates generally to trellis constructions and more particularly to a trellis having three dimensions.

In the prior art, there have been various planar trellis constructions. However, there has not been any teaching of three dimensional trellis constructions. The primary advantage of a three dimensional trellis construction is that it can be used for decoration in open locations that do not have walls close by. The planar trellises are unsuitable for use in open locations because they do not look very nice unless they are proximately disposed with relation to a wall of a building or the like.

In order to produce a trellis structure which is suitable for open spaces where there are no walls or the like, I have provided a three dimensional trellis which is collapsible and can be easily assembled because of its simple construction.

It is therefore an object of this invention to provide a new and improved trellis construction.

It is further an object of this invention to provide a three dimensional trellis construction which is suitable for decorating open places.

Still even further, it is an object of this invention to provide a new and improved trellis construction which is three dimensional and can be collapsed for storage.

Figure 1:
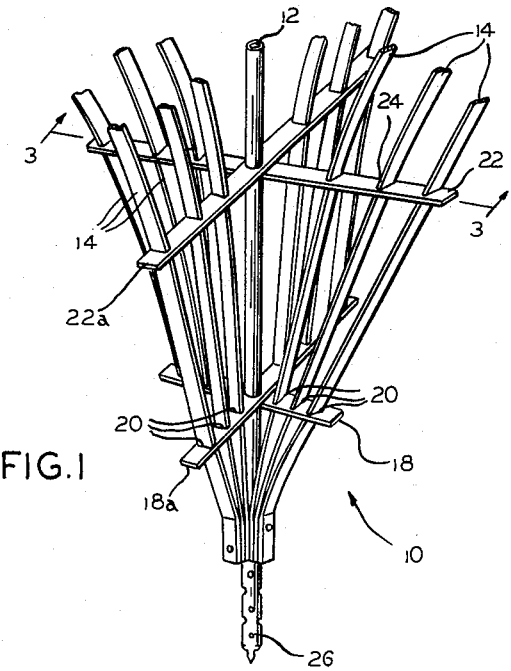
Figure 2:
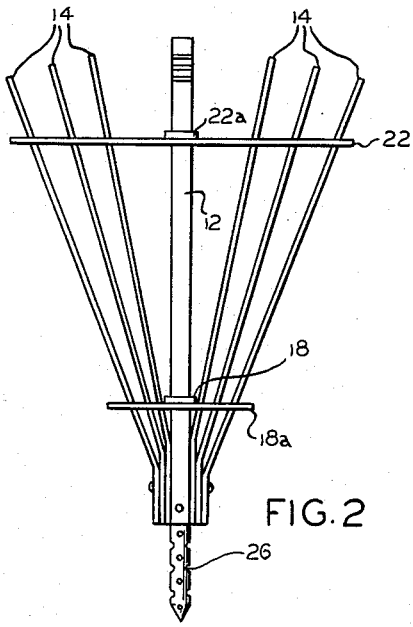
Figure 3:
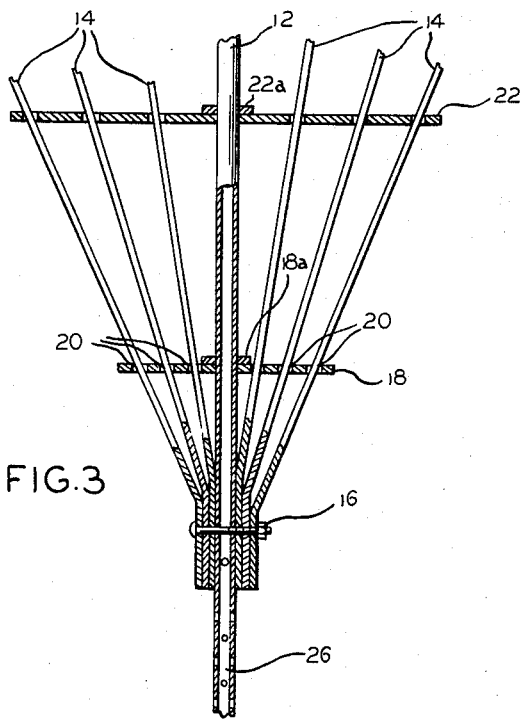
Figure 4:
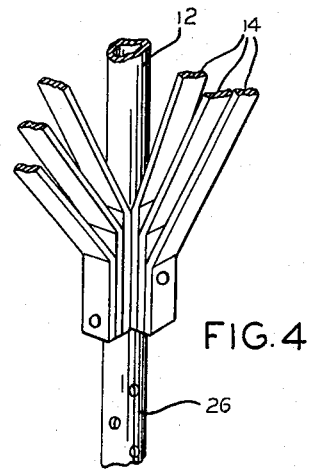

These and other objects and advantages of the invention will become readily apparent from the following description made in connection with the accompanying drawing in which:

FIG. 1 is a pictorial view illustrating my invention;
FIG. 2 is a side elevational view of FIG. 1;
FIG. 3 is a fragmentary cross sectional view of FIG. 1 taken on a plane passing through the line 3—3 and looking in the direction of the arrows; and
FIG. 4 is a partial pictorial view of FIG. 1 illustrating a preferred manner of attaching the trellis arms of my invention.

Referring generally to the drawing, I have illustrated a double type of three dimensional trellis comprising: a central member which has removably fastened thereto a plurality of resilient trellis arms, said arms flaring outward from where they are attached to the central member in four directions and being substantially within two imaginary perpendicular planes intersecting each other at the center line of the central member. Strip like primary and secondary spacer members, having perforations in straight line alignment therein receive the trellis arms therethrough and the members are held securely with relation to each other by the friction between the sides of the perforations in the spacer members and the resilient trellis arms.

Although I have illustrated a preferred embodiment of a three dimensional trellis, it should be understood that other alternatives for carrying out my invention are intended. I intend my invention to cover any trellis construction wherein the trellis arms flare outward from where they are attached in more than one planar direction. Also, the number and shape of the spacer members to hold the trellis arms of my construction should not be limited as I contemplate any means associated with my trellis structure for the purpose of holding the trellis arms thereof in position. For instance, I contemplate that instead of having the trellis arms of my invention flaring outward in four directions and in alignment with each other in two imaginary perpendicular planes, it is possible to have a structure where the trellis arms flare outward in more than four directions to produce a fuller appearing trellis structure. With such an alternative structure, different spacer members could be used. For instance, spacer members having a greater area with perforations which are not in straight line alignment could be used to position the trellis arms thereby producing such a structure.

Referring more specifically to the drawing, I have illustrated a double trellis 10 having a central member 12. A plurality of resilient trellis arms 14 are removably attached to the central member 12 proximate one end thereof by fastening means such as the nut and bolt 16 as illustrated in FIGURES 1 and 3. The trellis arms 14 flare outward from the central member substantially within a pair of imaginary perpendicular planes (not shown) having their point of intersection coincident with the center point of the central member 12. A pair of strip like primary spacer members 18 and 18a having perforations 20 therein which are in straight line alignment and are slidably mounted on the central member 12 are disposed within the perpendicular planes that include the trellis arms. Each of the trellis arms 14 protrude through one of the perforations 20 in the primary spacer members 18 and 18a and they are held in position with relation thereto and to each other by the friction between the sides of the perforations 20 and the resilient trellis arms 14. Secondary strip like spacer members 22 and 22a which are constructed the same as the primary spacers 18 and 18a are also slidably disposed in the same manner as the primary spacer members. The secondary strip like spacer members as illustrated in the drawing, are different from the primary spacer members in that they are longer. However, they serve the same function as the primary spacer members do in my trellis construction as they also have perforations 24 in straight line alignment, which have the trellis arms 14 protruding therethrough and being held in position thereby. The spacing of the perforations from each other makes it possible for the trellis arms to be positioned to give a flaring effect. If it is desired, a cylindrical root feeder 26 may be incorporated in my invention, as illustrated in the drawing. The central member 12, being a cylinder, is hollow and can be formed as a root feeder. When a root feeder is incorporated in my trellis construction, the roots of plants can be nourished by merely pouring water or other liquids down through the central member 12 of my trellis construction.

My trellis can be easily assembled or taken apart. To assemble it, the trellis arms are merely bolted to the central member 12 and the primary spacer members are slide into position; then the secondary spacer members are slid into position. It will be noticed that the primary spacer members have their perforations disposed so that the trellis arms, when they are positioned in the perforations illustrated in the drawing, have a tendency to flare outward. The secondary spacer members, once they are positioned, have their perforations disposed so that they cause the trellis arms to be pressed toward the central member. The difference in the direction of the forces on the trellis arms, due to the disposition of the perforations in the spacer members, causes friction to be set up between the trellis arms and the spacer members and accordingly my trellis is held together. To disassemble my trellis construction, the primary and secondary spacer members need only be forced off from the trellis arms. The result is that my trellis is collapsed into a compact package. If it is desired to still further disassemble my trellis construction, the nuts and bolts 16 need only be unfastened and the trellis arms disassembled from the central member.

Different types of materials can be used in constructing my invention. However, I have found that kiln dried redwood can be utilized for the trellis arms because it is resilient and never needs to be varnished, oiled or painted to protect against decay.

Although I have shown specific constructions of my invention, I am fully cognizant of the fact that many changes in the shape and contour may be made without effecting its operativeness and I reserve the rights to make such changes as I may deem convenient without departing from the spirit of my invention, or the scope of the claims.

I claim:

1. A trellis comprising: a central member, a plurality of resilient trellis arms being attached to said central member proximate one end thereof, all of said trellis arms flaring out from said central member in one of four different directions, and being in alignment with one of two imaginary perpendicular planes having a point of intersection coincident with the center of said central member, and a pair of first and second strip like spacer members having perforations therein in straight line alignment, said first pair of spacer members being disposed perpendicular with respect to each other and being slidably associated with said central member, said trellis arms each protruding through the perforations of one of said spacer members of said first pair, said second pair of spacer members being disposed perpendicular with respect to each other proximate the free end of said trellis arms, said trellis arms each protruding through the perforations of one of said spacer members of said second pair, said perforations of said spacer members being disposed to cause the sides of said trellis arms to be forced against the sides of said perforations whereby the friction between said perforations and said trellis arms keeps said members and arms in a certain position relative to each other.

2. A trellis, as defined in claim 1, wherein said pairs of first and second spacer members can be selectively disposed with relation to each other, whereby the position of said trellis arms can be determined by slidably disposing said spacer members at different locations with respect to each other.

References Cited in the file of this patent

UNITED STATES PATENTS

| | | |
|---|---|---|
| 870,864 | Barker | Nov. 12, 1907 |
| 1,031,941 | Lanham | July 9, 1912 |

FOREIGN PATENTS

| | | |
|---|---|---|
| 367,675 | France | Sept. 11, 1906 |
| 643,171 | Germany | June 18, 1937 |